US008576310B2

(12) United States Patent
Tatsuzawa

(10) Patent No.: US 8,576,310 B2
(45) Date of Patent: Nov. 5, 2013

(54) IMAGE PROCESSING APPARATUS, CAMERA MODULE, AND IMAGE PROCESSING METHOD

(75) Inventor: Yukiyasu Tatsuzawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 462 days.

(21) Appl. No.: 13/047,112

(22) Filed: Mar. 14, 2011

(65) Prior Publication Data
US 2012/0019692 A1   Jan. 26, 2012

(30) Foreign Application Priority Data

Jul. 22, 2010 (JP) ................................. 2010-164928

(51) Int. Cl.
*H04N 9/64* (2006.01)
*H04N 5/202* (2006.01)

(52) U.S. Cl.
USPC ............................ 348/246; 348/243; 348/254

(58) Field of Classification Search
USPC ............ 348/243, 246, 247, 254, 615, E5.081, 348/E9.037, E5.091, E5.079
See application file for complete search history.

(56) References Cited

U.S. PATENT DOCUMENTS

| 7,408,578 | B2* | 8/2008 | Chapman et al. | 348/308 |
|---|---|---|---|---|
| 7,777,791 | B2 | 8/2010 | Sasaki | |
| 7,812,866 | B2 | 10/2010 | Sasaki | |
| 7,911,514 | B2 | 3/2011 | Sasaki | |
| 8,009,209 | B2* | 8/2011 | Chapman et al. | 348/246 |
| 8,023,010 | B2 | 9/2011 | Sasaki | |
| 2004/0120602 | A1* | 6/2004 | Nakajima et al. | 382/275 |
| 2005/0195163 | A1* | 9/2005 | Grewal et al. | 345/157 |
| 2006/0290795 | A1* | 12/2006 | Itoh | 348/246 |
| 2007/0146697 | A1* | 6/2007 | Noguchi et al. | 356/237.5 |
| 2009/0148031 | A1* | 6/2009 | Fukami | 382/141 |
| 2011/0001853 | A1* | 1/2011 | Sato et al. | 348/246 |

FOREIGN PATENT DOCUMENTS

| JP | 2002-330354 A | 11/2002 |
|---|---|---|
| JP | 2004-320128 A | 11/2004 |
| JP | 2008-278324 | 11/2008 |

OTHER PUBLICATIONS

Japanese Office Action Issued Jan. 22, 2013 in Patent Application No. 2010-164928 (with English translation).

* cited by examiner

*Primary Examiner* — Hung Lam
(74) *Attorney, Agent, or Firm* — Oblon, Spivak, McClelland, Maier & Neustadt, L.L.P.

(57) ABSTRACT

According to one embodiment, a second determining unit performs defect determination according to an illumination light component, which is a component of illumination light irradiated onto an object, of pixel values of a plurality of adjacent pixels. A third determining unit performs defect determination according to a reflectivity component, which is a component based on a unique reflectivity of the object, of the pixel values of the plurality of adjacent pixels.

18 Claims, 6 Drawing Sheets

IMAGE PROCESSING APPARATUS, CAMERA MODULE, AND IMAGE PROCESSING METHOD

CROSS-REFERENCE TO RELATED APPLICATIONS

This application is based upon and claims the benefit of priority from the prior Japanese Patent Application No. 2010-164928, filed on Jul. 22, 2010; the entire contents of which are incorporated herein by reference.

FIELD

Embodiments described herein relate generally to an image processing apparatus, a camera module, and an image processing method.

BACKGROUND

Recently, the density of pixels of a camera module, such as a camera mounted in a mobile phone, a digital camera, and the like has been increasing. In regard with camera modules, the miniaturization of pixels is required with an increase in the pixel density. Under this situation, such a problem is at issue that there is an absent portion (hereinafter, appropriately referred to as "a defect") of a digital image signal due to a pixel which does not normally function. In a defect inspection during the manufacture of a camera module, in the case where pixel defects more than a rule are recognized, the camera module is processed as a defective product. As the rule becomes stricter, the yield of camera modules is reduced and thus the manufacturing cost increases. Accordingly, in the related art, a method of obscuring a defect by signal processing in a defect correction circuit is actively used.

Defect detecting methods are generally classified into two types, a predetection type and a dynamic detection type. The predetection type is a method which detects a defect caused during defect inspection after the manufacture of a camera module and stores address information on the defect in each sensor. The predetection type of method is mainly used for the purpose of correcting a defect caused by a defect of a multi-layer structure, a leakage current of a floating junction, etc. The dynamic detection type is a method which detects a defect from a digital image signal during an operation of a camera module. The dynamic detection type of method is mainly used for the purpose of correcting a photodiode-based defect which randomly occurs depending on a temperature characteristic, an exposure time period, etc.

As a dynamic detection type of defect correction circuit, for example, there is a circuit for performing a defect determination by comparing a difference between a pixel value of a target pixel and the maximum value of pixel values of adjacent pixels with a preset threshold value. Also, there is a circuit for suppressing defect correction on an edge portion of an image to prevent erroneous correction. The noticeability of a defect depends on a luminance distribution of a portion where the defect occurs in an image. For example, a white defect is easily noticeable if existing in a dark portion and a case where erroneous correction has been performed is as easily noticeable as a bright portion. In the case of setting a constant threshold value regardless of luminance, it is difficult to perform defect correction suitably for light and darkness of an image. Further, controlling in order not to perform defect correction on an edge portion has a problem in which correction is not performed even on a noticeable defect existing in the edge portion.

DETAILED DESCRIPTION

According to an embodiment, an image processing apparatus includes a defect determining unit. The defect determining unit determines whether a target pixel is a defect or not, on the basis of the pixel value of the target pixel and the pixel values of a plurality of adjacent pixels. The adjacent pixels are pixels for the same color as the target pixel and are positioned at the periphery of the target pixel. The defect determining unit includes a first determining unit, a second determining unit, and a third determining unit. The first determining unit performs defect determination by comparing the maximum value and minimum value of the pixel values of the plurality of adjacent pixels with the pixel value of the target pixel. The second determining unit performs defect determination according to an illumination light component, which is a component of illumination light irradiated onto an object, of the pixel values of the plurality of adjacent pixels. The third determining unit performs defect determination according to a reflectivity component, which is a component according to the unique reflectivity of the object, of the pixel values of the plurality of adjacent pixels.

Exemplary embodiments of an image processing apparatus, a camera module, and an image processing method will be explained below in detail with reference to the accompanying drawings. The present invention is not limited to the following embodiments.

Figure 1:
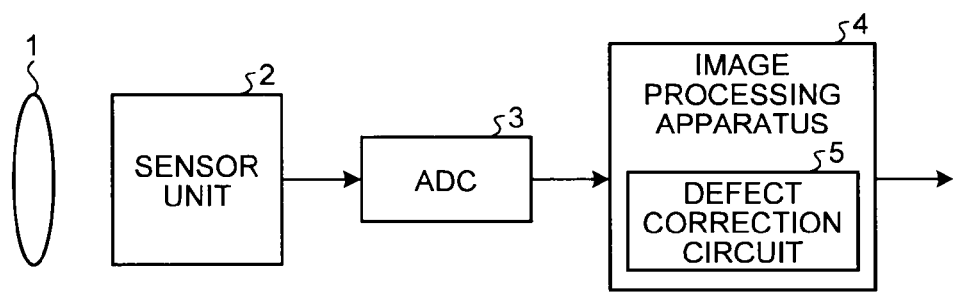
FIG. 1 is a block diagram illustrating a configuration of a camera module according to an embodiment.

FIG. 1 is a block diagram illustrating a configuration of a camera module according to an embodiment. A camera module includes an imaging lens 1, a sensor unit 2, an analog-to-digital converter (ADC) 3, and an image processing apparatus 4. The imaging lens 1 captures light from an object and focuses the light onto the sensor unit 2.

The sensor unit 2 converts the light captured by the imaging lens 1 into signal charge, thereby capturing an object image. The sensor unit 2 receives signal levels of R, G, and B in the order corresponding to a Bayer array, sequentially amplifies the received analog image signals with a gain according to a capturing condition set from the outside, and sequentially outputs the amplified analog image signals. The ADC 3 converts the analog image signals from the sensor unit 2 into digital image signals.

The image processing apparatus 4 performs image processing on the digital image signals from the ADC 3. The image processing apparatus 4 is provided with a defect correction circuit 5 which performs defect correction. In addition, the image processing apparatus 4 performs various kinds of image processing, for example, demosaicing, white balance adjustment, gamma processing, etc.

Figure 2:
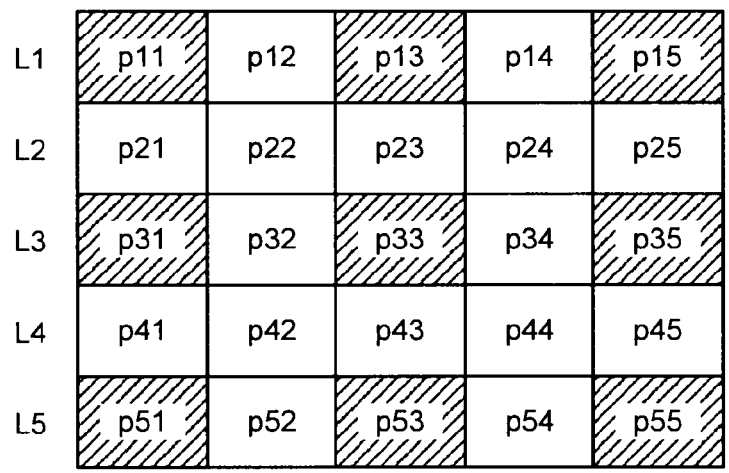
FIG. 2 is a conceptual view illustrating pixels with pixel values referred to during defect correction in a defect correction circuit.

FIG. 2 is a conceptual view illustrating pixels with pixel values referred to during defect correction in the defect correction circuit. The Bayer array is configured to have four pixels of Gr, R, Gb, and B as a unit. The Gr pixel is a G pixel parallel to the R pixel on a line. The Gb pixel is a G pixel parallel to the B pixel on a line. The image signals are input as signals of each line (a Gr/R line and a Gb/B line) to the defect correction circuit 5.

The defect correction circuit 5 sets a central pixel p33 of 25 pixels forming a matrix of 5 lines L1 to L5 in a vertical direction by 5 pixels in a horizontal direction, as a target pixel which is a subject of defect determination and defect correction. The defect correction circuit 5 performs defect determination and defect correction on the basis of the pixel value of the target pixel p33 and the pixel values of 8 adjacent pixels p11, p13, p15, p31, p35, p51, p53, and p55. The adjacent pixels are pixels for the same color as the target pixel and are located at the periphery of the target pixel. The defect correction circuit 5 is a kernel of 3 horizontal pixels by 3 vertical pixels (3×3) for the same color and performs signal processing.

Figure 3:
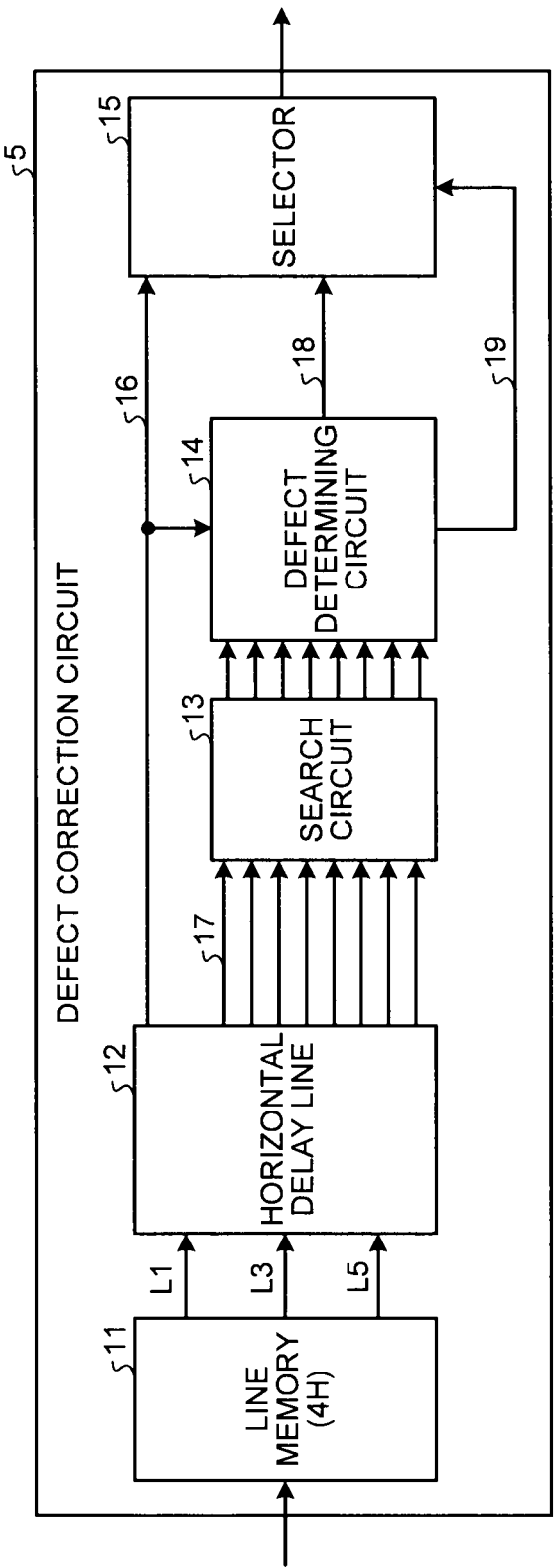
FIG. 3 is a block diagram illustrating a configuration of the defect correction circuit.

FIG. 3 is a block diagram illustrating a configuration of the defect correction circuit. The defect correction circuit 5 includes a line memory 11, a horizontal delay line 12, a search circuit 13, a defect determining circuit (defect determining unit) 14, and a selector 15. The line memory 11 stores signals of 4 lines 4H and performs horizontal delay (line delay). The line memory 11 outputs the stored signals of 3 lines L1, L3, and L5, including the target pixel and the adjacent pixels, of total 5 lines including 4 lines L1, L2, L3, and L4 and one main line L5, to the horizontal delay line 12.

Figure 4:
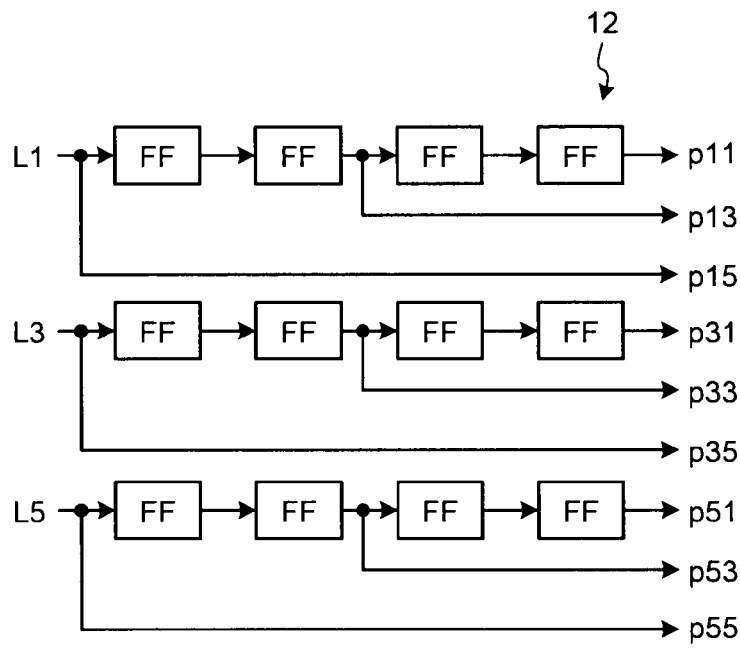
FIG. 4 is a block diagram illustrating a configuration of the horizontal delay line.

FIG. 4 is a block diagram illustrating a configuration of the horizontal delay line. Flip-flops FF store the signal level of each pixel. The horizontal delay line 12 stores signals of 4 pixels for each line and performs horizontal delay. The horizontal delay line 12 synchronizes a signal 16 for the target pixel with signals (see FIG. 3) for the 8 adjacent pixels. The horizontal delay line 12 outputs the signal 16 for the target pixel to the defect determining circuit 14 and the selector 15. The horizontal delay line 12 outputs the signals 17 for the adjacent pixels to the search circuit 13. The search circuit 13 searches the maximum value and minimum value of the pixel values of the adjacent pixels.

Figure 5:
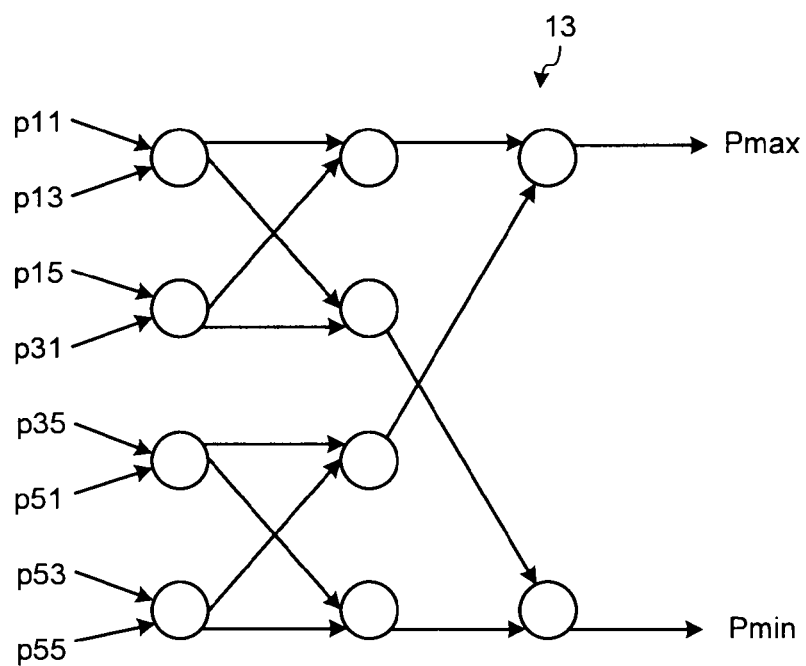
FIG. 5 is a conceptual view illustrating a configuration of the search circuit.

FIG. 5 is a conceptual view illustrating a configuration of the search circuit. Circles in FIG. 5 represent comparators for comparing the levels of two input signals, arrows indicating a direction entering the left sides of the circles represent input signals, and arrows indicating a direction exiting from the right sides of the circles represent output signals. Of two arrows representing output signals from one comparator, the upper one represents an output signal with a higher level and the lower one represents an output signal with a lower level.

The search circuit 13 compares the pixel values of two pixels of each of four groups at the first stage of a search tree, and moves a larger one to the upper level of the search tree and moves a smaller one to the lower level of the search tree. The search circuit 13 repeats a similar process at the second stage.

At the third stage of the search tree, the search circuit 13 compares two uppermost pixels so as to obtain the maximum value Pmax, and compares two lowermost pixels so as to obtain the minimum value Pmin.

Figure 6:
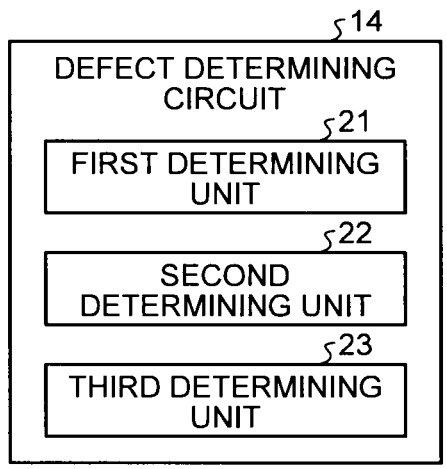
FIG. 6 is a block diagram illustrating a configuration of the defect determining circuit.

FIG. 6 is a block diagram illustrating a configuration of the defect determining circuit. The defect determining circuit 14 determines whether the target pixel is a defect or not, on the basis of the pixel value of the target pixel and the pixel values of the adjacent pixels. The defect determining circuit 14 includes a first determining unit 21, a second determining unit 22, and a third determining unit 23.

Retinex theory proposed in the related art is a model in which a camera determines luminance according to a physical amount of light of each pixel, while the visual system of human removes illumination light, etc., and perceives a relative luminance ratio of each region. In this theory, light entering eyes can be decomposed into a component of illumination light irradiated onto an object and a component according to the unique reflectivity of the object independent from illumination. According to the Retinex theory, a pixel value I is modeled as a product of an illumination light component L and a reflectivity component R as expressed by Equation (1).

$$I = L \times R \tag{1}$$

The illumination light component L is a component of illumination light irradiated onto the object. The reflectivity component R is a unique image component of the object independent from illumination. The defect determining circuit 14 of the present embodiment performs defect determination according to the illumination light component L and the reflectivity component R.

The first determining unit 21 performs defect determination (first determination) by comparing the maximum value Pmax and minimum value Pmin of the pixel values of the adjacent pixels with the pixel value of the target pixel. The second determining unit 22 performs defect determination (second determination) according to the illumination light components L of the pixel values of the 8 adjacent pixels. The third determining unit 23 performs defect determination (third determination) according to the reflectivity components R of the pixel values of the 8 adjacent pixels.

Figure 7:
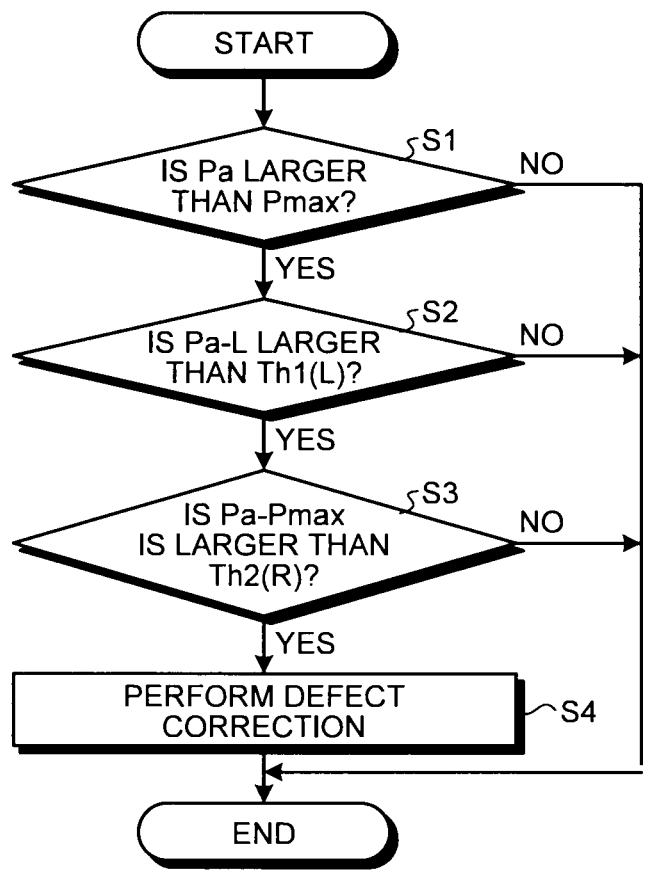
FIG. 7 is a flow chart illustrating a process of defect determination and defect correction by the defect correction circuit.

FIG. 7 is a flow chart illustrating a process of defect determination and defect correction by the defect correction circuit. As examples of a defect which is a subject of the defect determination, there are a so-called black defect in which the luminance of a pixel becomes lower than a case where the pixel normally functions and a so-called white defect in which the luminance of a pixel becomes higher than the case where the pixel normally functions. Here, a case of determining whether the target pixel is a white defect or not will be described as an example.

The first determining unit 21 compares the pixel value Pa of the target pixel with the maximum value Pmax (step S1). The first determining unit 21 determines whether the pixel value Pa of the target pixel is the maximum of the pixel values of the target pixel and the 8 adjacent pixels. In the case where the pixel value Pa of the target pixel is not larger than the maximum value Pmax (No in step S1), the defect determining circuit 14 determines that the target pixel is not a defect and finishes the process. For example, although the target pixel is a white defect, in the case where the pixel value Pa is not larger than the maximum value Pmax, the defect correction circuit 5 determines that the defect is not noticeable, and excludes the pixel from the subject of defect correction.

In the case where the pixel value Pa of the target pixel is larger than the maximum value Pmax (Yes in step S1), the second determining unit 22 compares a difference Pa-L between the pixel value Pa and the illumination light component L with a first threshold value Th1(L) (step S2). The second determining unit 22 estimates, for example, the average of the pixel values of the 8 adjacent pixels as the illumination light component L and performs the defect determination. Therefore, the second determining unit 22 can perform the defect determination by using the illumination light component L obtained by a simple operation. Further, the estimation value of the illumination light component L is not limited to the average of the pixel values of the plurality of adjacent pixels, but may be a value obtained by any method.

Figure 8:
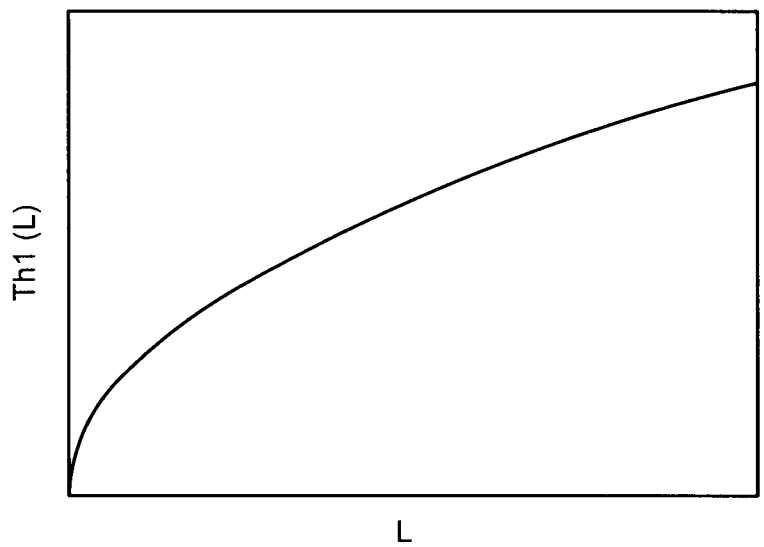
FIG. 8 is a view illustrating an example of the relationship between an illumination light component and a first threshold value.

FIG. 8 is a view illustrating an example of the relationship between the illumination light component L and the first threshold value Th1(L). The first threshold value Th1(L) is a value that varies corresponding to the illumination light component L as a function of the illumination light component L. The first threshold value Th1(L) may be any function such as a gamma function like, for example, $L^\gamma$, a linear function like $a \times L+b$, etc. The second determining unit 22 uses a value obtained by substituting the illumination light component L for the first threshold value Th1(L) for comparison with the difference Pa-L. The first threshold value Th1(L) may be, for example, a value obtained by referring to a lookup table LUT.

In the case where the difference Pa-L is not larger than the first threshold value Th1(L) (No in step S2), the defect determining circuit 14 determines that the target pixel is not a defect and finishes the process. In the case where the difference Pa-L is larger than the first threshold value Th1(L) (Yes in step S2), the third determining unit 23 compares a difference Pa−Pmax between the pixel value Pa of the target pixel and the maximum value Pmax with a second threshold value Th2(R) (step S3). The second threshold value Th2(R) is a value which varies corresponding to the reflectivity component R as a function of the reflectivity component R.

The third determining unit 23 estimates the arithmetic average of the absolute values of differences (deviations) between the pixel values and illumination light components L of the 8 adjacent pixels P11, . . . , and P55 as the reflectivity component R, as expressed by, for example, the following Equation (2), and performs the defect determination.

$$R=\{|L-(\text{Pixel Value of Pixel }P11)|+\ldots|L-(\text{Pixel Value of Pixel }P55)|\}/8 \quad (2)$$

Therefore, the third determining unit 23 can perform the defect determination by using the reflectivity component R obtained by a simple operation. The estimation of the reflectivity component R by Equation (2) dose not need a circuit for division and thus is advantageous for mounting, as compared to the case of calculating the reflectivity component R by the operation (R=1/L) based on Equation (1). Further, the estimation value of the reflectivity component R is not limited to a value obtained by Equation (2), but may be a value obtained by any method. The reflectivity component R can be regarded as an equivalent of an edge component. The estimation value of the reflectivity component R may be a value useable as an edge component, for example, the difference between the maximum value Pmax and the minimum value Pmin of the pixel values of the adjacent pixels.

Figure 9:
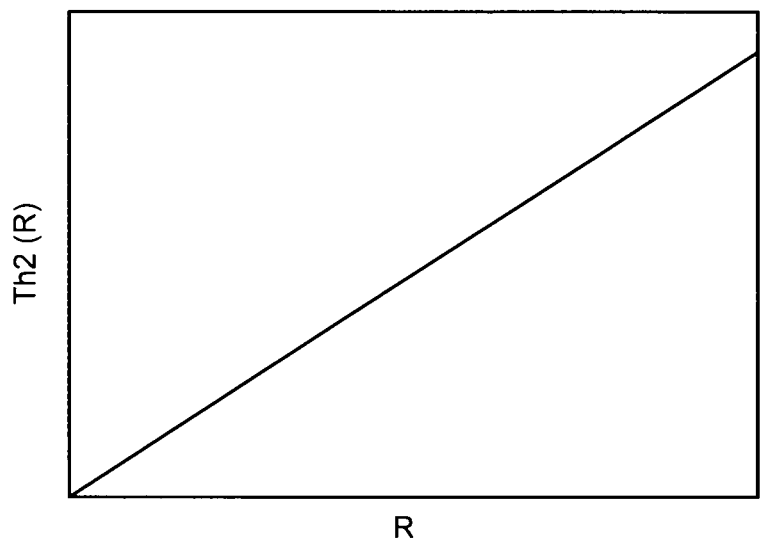
FIG. 9 is a view illustrating an example of the relationship between a reflectivity component and a second threshold value.

FIG. 9 is a view illustrating an example of the relationship between the reflectivity component and the second threshold value. The second threshold value Th2(R) may be any function, for example, a linear function like $a \times L+b$, etc. The third determining unit 23 uses a value obtained by substituting the reflectivity component R for the second threshold value Th2(R) for comparison with the difference Pa−Pmax. The second threshold value Th2(R) may be, for example, a value obtained by referring to the lookup table LUT.

In the case where the difference Pa−Pmax is not larger than the second threshold value Th2(R) (No in step S3), the defect determining circuit 14 determines that the target pixel is not a defect and finishes the process. In the case where the difference Pa−Pmax is larger than the second threshold value Th2(R) (Yes in step S3), the defect determining circuit 14 determines that the target pixel is a white defect. In the case where the defect determining circuit 14 determines that the target pixel is a defect, the defect correction circuit 5 performs defect correction (step S4), and finishes the process.

In the case of determining that the target pixel is a defect, the defect correction circuit 5 performs defect correction by replacing the pixel value of the target pixel with a pixel value of a pixel to be a source for replacement (hereinafter, referred to as a replacement source pixel). In the case where the target pixel is the white defect, for example, the maximum value Pmax is used as the pixel value of the replacement source pixel. According to a result of defect determination of the defect determining circuit 14, the selector 15 selects and outputs any one of the pixel value (signal 16) of the target pixel input from the horizontal delay line 12 and the pixel value (signal 18) of the replacement source pixel input from the defect determining circuit 14.

In the case of determining that the target pixel is a white defect, the defect determining circuit 14 outputs a switch signal 19 to switch the pixel value of the target pixel to the selector 15. According to the switch signal 19 to switch the pixel value, the selector 15 selects and outputs the pixel value (signal 18) of the replacement source pixel. If there is no instruction for pixel value replacement by the switch signal, the selector 15 selects and outputs the pixel value (signal 16) of the target pixel.

The defect determining circuit 14 performs defect determination by the third determining unit 23, thereby reducing erroneous determination in which a pixel that is not a defect is determined as a defect in, for example, a domain with a high spatial frequency. By making it possible to reduce erroneous correction caused by erroneous determination in the defect correction circuit 5, the image processing apparatus 4 can reduce resolution deterioration. Further, with respect to the case of performing control so as not to uniformly perform defect correction in an edge portion, in the present embodiment, correction of a noticeable defect occurring in the edge portion is possible.

Figure 10A:
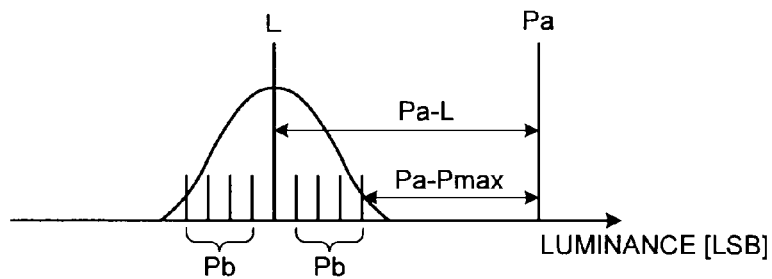
FIGS. 10A to 10C are views illustrating the relationship between defect determination and a distribution of a pixel value of a target pixel and pixel values of adjacent pixels.
Figure 10B:
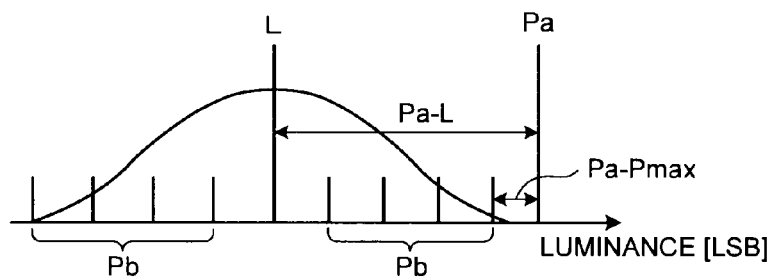
Figure 10C:
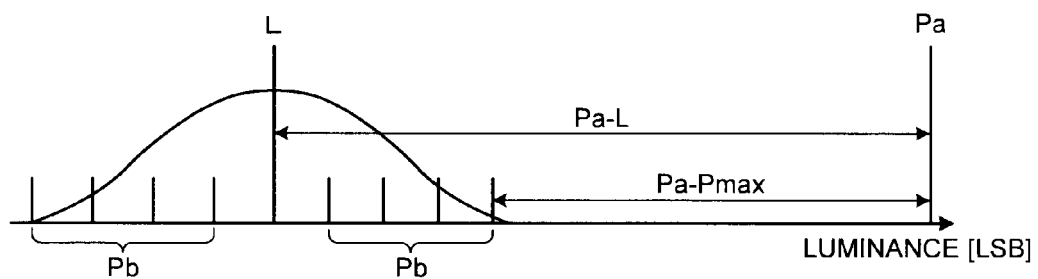

FIGS. 10A to 10C are views illustrating the relationship between a distribution of the pixel value of the target pixel and the pixel values of the adjacent pixels and defect determination. In FIGS. 10A to 10C, all of the horizontal axes represent luminance [LSB], and positions of vertical lines in the horizontal directions represent a pixel value of each pixel and the luminance of an illumination light component L. The illumination light component L is set to an average value of the pixel values Pb of the adjacent pixels. Here, determination on whether the target pixel is a white defect or not is given as an example.

FIG. 10A illustrates a case where the difference Pa-L is larger than the first threshold value Th1(L) and the difference Pa−Pmax is larger than the second threshold value Th2(R). The pixel values Pb of the adjacent pixels are distributed in a narrow luminance range. As the width of the luminance range in which the pixel values Pb are distributed is reduced, the reflectivity component R and the second threshold value Th2(R) become smaller values. The pixel value Pa of the target pixel is separated far from the luminance range in which the pixel values Pb of the adjacent pixels are distributed toward the high luminance side. In this case, the defect determining circuit 14 determines that the target pixel is a white defect. In this case, the defect determining circuit 14 determines that the target pixel is a defect, and thus the defect correction circuit 5 can appropriate correct the noticeable defect occurred at a portion in which a change in the luminance is little.

FIG. 10B illustrates a case where the pixel value Pa of the target pixel and the illumination light component L are the same as those in the case illustrated in FIG. 10A and the pixel values Pb of the adjacent pixels are distributed in a wide luminance range. It is assumed that the difference Pa−Pmax is smaller than the second threshold value Th2(R). As the luminance range in which the pixel values Pb are distributed is widened, the reflectivity component R and the second threshold value Th2(R) become larger values. The pixel value Pa of the target pixel is separated a little from the luminance range in which the pixel values Pb of the adjacent pixels are distributed toward the high luminance side. In the case, the defect determining circuit 14 determines that the target pixel is not a white defect. In this case, the defect determining circuit 14 determines that the target pixel is not a defect, and thus the defect correction circuit 5 can suppress erroneous correction, for example, in the case where the target pixel is a portion of an edge.

FIG. 10C illustrates a case where a distribution of the pixel values Pb of the adjacent pixels, the illumination light component L, and the reflectivity component R are the same as those in the case illustrated in FIG. 10B, while the pixel value Pa of the target pixel is separated far from a luminance range in which the pixel values Pb of the adjacent pixels are distributed toward the high luminance side. It is assumed that the difference Pa−L is larger than the first threshold value Th1(L) and the difference Pa−Pmax is larger than the second threshold value Th2(R). In this case, the defect determining circuit 14 determines that the target pixel is a white defect. In the case, the defect determining circuit 14 determines that the target pixel is a defect, and thus the defect correction circuit 5 can appropriately correct, for example, a noticeable defect occurring in an edge portion.

The defect correction circuit 5 uses the first threshold value Th1(L) according to the illumination light component L and the second threshold value Th2(R) according to the reflectivity component R as the threshold values used for the defect determination, thereby capable of performing defect correction suitably for the light and darkness of an image or a frequency characteristic. The defect correction circuit 5 can suppress resolution deterioration caused by erroneous correction while effectively correcting a defect estimated to be visually noticeable. For example, a case of a white defect is more easily noticeable in a lower-luminance portion of an image. With respect to a white defect, the defect correction circuit 5 can easily detect the defect by reducing the threshold value in a dark portion, and prevent erroneous correction by increasing the threshold value in a light portion. The image processing apparatus 4 can obtain a high-quality image by appropriate correction in the defect correction circuit 5.

For example, the case of applying the present embodiment to an image obtained by adding a defect to a Siemens star chart is confirmed to have a small difference in the frequency characteristic from the case of the related art canceling defect correction in an edge portion. The defect correction circuit 5 of the present embodiment can suppress erroneous correction to the same extent as the related art.

Even in the case of determining whether the target pixel is a black defect or not, the defect determining circuit 14 performs a process similar to the case of the white defect determination except that the level of the luminance is opposite to that of the white defect determination. In the case of the black defect determination, the first determining unit 21 compares the pixel value Pa of the target pixel with the minimum value Pmin of the pixel values of the adjacent pixels. In the case where the pixel value Pa of the target pixel is smaller than the minimum value Pmin, the second determining unit 22 compares a difference L-Pa between the illumination light component L and the target value Pa with the first threshold value Th1(L). The third determining unit 23 compares a difference Pmin-Pa between the minimum value Pmin and the pixel value Pa of the target pixel with the second threshold value Th2(R). In the case of determining that the target pixel is a black defect, the defect correction circuit 5 replaces the pixel value of the target pixel with, for example, the minimum value Pmin.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
a defect determining unit determining whether a target pixel is a defect or not, on the basis of a pixel value of the target pixel and pixel values of a plurality of adjacent pixels which are pixels for the same color as the target pixel and are positioned at the periphery of the target pixel, wherein
the defect determining unit includes:
a first determining unit performing defect determination by comparing the maximum value and minimum value of the pixel values of the plurality of adjacent pixels with the pixel value of the target pixel;
a second determining unit performing defect determination according to an illumination light component, which is a component of illumination light irradiated onto an object, of the pixel values of the plurality of adjacent pixels; and
a third determining unit performing defect determination according to a reflectivity component, which is a component based on a unique reflectivity of the object, of the pixel values of the plurality of adjacent pixels.

2. The image processing apparatus according to claim 1, wherein the second determining unit performs the defect determination by comparing a difference between the pixel value of the target pixel and the illumination light component with a threshold value which is a function of the illumination light component.

3. The image processing apparatus according to claim 1, wherein the third determining unit performs the defect determination by comparing either a difference between the pixel value of the target pixel and the maximum value or a difference between the pixel value of the target pixel and the minimum value with a threshold value which is a function of the reflectivity component.

4. The image processing apparatus according to claim 1, wherein the second determining unit performs the defect determination by estimating an average of the pixel values of the plurality of adjacent pixels as the illumination light component.

5. The image processing apparatus according to claim 1, wherein the third determining unit performs the defect determination by estimating an average of absolute values of differences between the pixel values of the plurality of adjacent pixels and the illumination light component as the reflectivity component.

6. The image processing apparatus according to claim 1, wherein the third determining unit performs the defect determination by estimating a difference between the maximum value and the minimum value as the reflectivity component.

7. A camera module comprising:
a lens unit capturing light from an object;
an image sensor generating an image signal according to the light captured by the lens unit; and
an image processing apparatus performing image processing on the image signal from the image sensor, wherein
the image processing apparatus includes
a defect determining unit determining whether a target pixel is a defect or not, on the basis of a pixel value of the target pixel and pixel values of a plurality of adjacent pixels which are pixels for the same color as the target pixel and are positioned at the periphery of the target pixel, and
the defect determining unit includes:
a first determining unit performing defect determination by comparing the maximum value and minimum value of the pixel values of the plurality of adjacent pixels with the pixel value of the target pixel,
a second determining unit performing defect determination according to an illumination light component, which is a component of illumination light irradiated onto the object, of the pixel values of the plurality of adjacent pixels, and
a third determining unit performing defect determination according to a reflectivity component, which is a component based on a unique reflectivity of the object, of the pixel values of the plurality of adjacent pixels.

8. The camera module according to claim 7, wherein the second determining unit performs the defect determination by comparing a difference between the pixel value of the target pixel and the illumination light component with a threshold value which is a function of the illumination light component.

9. The camera module according to claim 7, wherein the third determining unit performs the defect determination by comparing either a difference between the pixel value of the target pixel and the maximum value or a difference between the pixel value of the target pixel and the minimum value with a threshold value which is a function of the reflectivity component.

10. The camera module according to claim 7, wherein the second determining unit performs the defect determination by estimating an average of the pixel values of the plurality of adjacent pixels as the illumination light component.

11. The camera module according to claim 7, wherein the third determining unit performs the defect determination by estimating an average of absolute values of differences between the pixel values of the plurality of adjacent pixels and the illumination light component as the reflectivity component.

12. The camera module according to claim 7, wherein the third determining unit performs the defect determination by estimating a difference between the maximum value and the minimum value as the reflectivity component.

13. An image processing method comprising:
performing defect determination to determine whether a target pixel is a defect or not, on the basis of a pixel value of the target pixel and pixel values of a plurality of adjacent pixels which are pixels for the same color as the target pixel and are positioned at the periphery of the target pixel, wherein
the defect determination includes:
first determination comparing the maximum value and minimum value of the pixel values of the plurality of adjacent pixels with the pixel value of the target pixel,
second determination according to an illumination light component, which is a component of illumination light irradiated onto an object, of the pixel values of the plurality of adjacent pixels, and
third determination according to a reflectivity component, which is a component based on a unique reflectivity of the object, of the pixel values of the plurality of adjacent pixels.

14. The image processing method according to claim 13, wherein, in the second determination, a difference between the pixel value of the target pixel and the illumination light component is compared with a threshold value which is a function of the illumination light component.

15. The image processing method according to claim 13, wherein, in the third determination, either a difference between the pixel value of the target pixel and the maximum value or a difference between the pixel value of the target pixel and the minimum value is compared with a threshold value which is a function of the reflectivity component.

16. The image processing method according to claim 13, wherein, in the second determination, an average of the pixel values of the plurality of adjacent pixels is estimated as the illumination light component.

17. The image processing method according to claim 13, wherein, in the third determination, an average of absolute values of differences between the pixel values of the plurality of adjacent pixels and the illumination light component is estimated as the reflectivity component.

18. The image processing method according to claim 13, wherein, in the third determination, a difference between the maximum value and the minimum value is estimated as the reflectivity component.

* * * * *